United States Patent [19]

Gallagher et al.

[11]  4,235,765

[45]  Nov. 25, 1980

[54] URETHANE ELASTOMERS HAVING REDUCED THIXOTROPY AND VISCOSITY

[75] Inventors: James A. Gallagher, Grosse Ile; Bernard A. Merkl, Riverview, both of Mich.

[73] Assignee: BASF Wyandotte Corporation, Wyandotte, Mich.

[21] Appl. No.: 1,025

[22] Filed: Jan. 4, 1979

[51] Int. Cl.$^3$ ................................................ C08K 5/41
[52] U.S. Cl. ........................... 260/30.8 R; 260/37 N
[58] Field of Search .......... 260/18 TN, 37 N, 30.8 R; 528/57

[56] References Cited

U.S. PATENT DOCUMENTS

| | | | |
|---|---|---|---|
| 3,088,825 | 5/1962 | Murphy | 528/57 |
| 3,210,302 | 10/1965 | Bowell et al. | 260/18TN |
| 3,626,023 | 12/1971 | Brizzys | 528/51 X |
| 3,645,979 | 2/1972 | Liebsch et al. | 528/51 X |
| 3,789,045 | 1/1974 | Coury et al. | 528/57 |
| 4,014,846 | 3/1977 | Ramlow et al. | 260/30.8 R X |

FOREIGN PATENT DOCUMENTS 769107  10/1967  Canada .

*Primary Examiner*—Sandra M. Person
*Attorney, Agent, or Firm*—Joseph D. Michaels; Arnold S. Weintraub

[57] ABSTRACT

Polyurethane elastomers having nearly Newtonian flow characteristics and having reduced thixotropy are provided by admixing with a pigmented polyol a minor amount of a sodium alkyl sulfate. The polyurethanes hereof are employed as surface coatings for athletic arenas, such as gymnasiums and the like.

14 Claims, No Drawings

URETHANE ELASTOMERS HAVING REDUCED THIXOTROPY AND VISCOSITY

BACKGROUND OF THE INVENTION

1. Field of the Invention

The present invention pertains to polyurethane elastomer compositions. More particularly, the present invention concerns pigmented polyurethane elastomer compositions. Even more particularly, the present invention concerns pigmented polyurethane elastomer compositions of reduced thixotropy.

2. Prior Art

The use of pigmented urethane elastomers in athletic surfacing, e.g. gymnasia, tennis courts and the like is known. In applying these elastomers it is essential that no ripples in the surface occur at the knit line thereof. If such ripples occur, then, the surface is substantially worthless. More specifically because of the large areas to be covered, the liquid uncured elastomer must be poured in a series of strips to cover the entire surface. When these strips flow together, a "knit line" sometimes results. This knit line may indicate an irregular surface in the immediate vicinity. This irregular surface is undesirable both from an aesthetic point of view and from a practical standpoint if the surface is to be used as a tennis court. Thus it is highly desirable that this type of poured athletic surface be completely free from any irregularities.

It has been observed that the creation or absence of ripples is a direct function of the flow behavior of the pigmented urethane elastomer composition. Thus, it is highly desirable that the uncured elastomer not only have a low viscosity but that the viscosity be as close to Newtonian as possible. Hence, the ideal herein is a low viscosity Newtonian fluid. Mere reduction in viscosity, alone, however, is insufficient to achieve the desired result.

The present invention, as will subsequently be detailed, provides an improved pigmented urethane elastomer of reduced viscosity and nearly Newtonian flow characteristics.

To the best of applicant's knowledge, the most closely related art is found in U.S. Pat. Nos. 3,626,023 and 3,645,979 as well as Canadian Pat. No. 769,107.

SUMMARY OF THE INVENTION

In accordance with the present invention improved pigmented urethane elastomers, particularly adapted for athletic surfacing, are provided by the incorporation thereinto of minor amounts of a sodium alkyl sulfate.

Generally, from about 0.01 to about 0.50 weight percent of the sulfate is employed, based on the weight of the system. Preferably, from about 0.025 to about 0.20 percent, by weight, of the sulfate, based on the total weight of the system, is employed.

The sulfate is employed by admixing it with the active hydrogen-containing component of the elastomer system.

The sodium alkyl sulfate may be employed with any polyurethane elastomer system. Generally, the alkyl portion contains from about ten to twenty carbon atoms in the alkyl portion thereof.

For a more complete understanding of the present invention reference is made to the following detailed description and accompanying examples thereof.

DESCRIPTION OF THE PREFERRED EMBODIMENT

In accordance with the present invention pigmented polyurethane elastomers have incorporated therewith minor amounts of a sodium alkyl sulfate. The incorporation of the sulfate into the elastomer system reduces the viscosity of the system while rendering the flow characteristics nearly Newtonian. In this regard it is to be noted that in athletic surfacing it is extremely important that the rheology of the system be as nearly Newtonian as possible. Hence, while reduced viscosity is important in such applications, it is also critical that the system have or evidence low thixotropy. It has been observed that the deployment of the sulfate provides a polyurethane elastomer system of both reduced viscosity and thixotropy while providing nearly Newtonian flow characteristics. This discovery was unexpected since similar types of surfactants are ineffective in achieving the desired result.

The polyurethane elastomers hereof are prepared by mixing together, at ambient conditions, (a) a low molecular weight polyisocyanate and (b) a compound containing at least two active hydrogen-containing groups, as determined by the Zerewitinoff method, in the presence of a catalyst and pigment. Ordinarily, the pigment and the catalyst are admixed with the active hydrogen-containing compound. The elastomer is then prepared by adding the isocyanate thereto.

Suitable polyisocyanates include, for example, aromatic diisocyanates, such as, toluene diisocyanate, polymeric diphenyl methane diisocyanate, 4,4'-diphenylmethane diisocyanate, 1,5-naphthalene diisocyanate, and the like and polymethylene diisocyanates, such as, tetramethylene diisocyanate and hexamethylene diisocyanate, quasi-prepolymers and mixtures of such organic polyisocyanates.

In general, any organic compound containing at least two active hydrogen atoms may be employed in the coating composition for reaction with the polyisocyanate to produce a polyurethane. Examples of suitable types of organic compounds containing at least two active hydrogen groups are castor oil, hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, as well as mixtures thereof.

Any suitable hydroxyl-containing polyester may be used such as are obtained, for example, from polycarboxylic acids and polyhydric alcohols. Any suitable polycarboxylic acid may be used, such as, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethyl-succinic acid, isophthalic acid, terephthalic acid, hemimellitic acid, and 1,4-cyclohexane-dicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol, such as, 2,2-(4,4'-hydroxyphenyl) propane, commonly known as Bisphenol A.

Any suitable polyalkylene polyether polyol may be used, such as, the polymerization product of an alkylene oxide or of a mixture of alkylene oxides with a polyhydric alcohol. Any suitable polyhydric alcohol may be used, such as, those disclosed above for use in the preparation of the hydroxyl-containing polyesters. Any suitable alkylene oxide may be used, such as, ethylene oxide, propylene oxide, butylene oxide, amylene oxide, and heteric or block copolymers of these oxides. The polyalkylene polyether polyols may be prepared from other starting materials, such as, tetrahydrofuran and alkylene oxide-tetrahydrofuran copolymers; epihalohydrins, such as, epichlorohydrin; as well as aralkylene oxides, such as, styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in Encyclopedia of Chemical Technology, vol. 7, pp. 257–262, published by Interscience Publishers, Inc. (1951) or in U.S. Pat. No. 1,922,459.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols, such as, pentaerythritol and sorbitol, may be employed. Thus, the polyether polyols which can be employed in this process are oxyalkylene polymers which have an oxygen/carbon atom ratio from about 1:2 to 1:4 and preferably an oxygen/carbon atom ratio from about 1:2.8 to 1:4 and from about 2 to 6 terminal hydroxyl groups and preferably about 2 to 4 terminal hydroxyl groups. The polyether polyols generally have an average equivalent weight from about 150 to 5000 and preferably have an average equivalent weight from about 200 to 2000. Polyoxypropylene glycols having molecular weights from about 400 to 6000 corresponding to equivalent weights from about 200 to 3000 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of a dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as, ethanolamine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used, such as, for example, the reaction product of formaldehyde or other suitable aldehyde with a dihydric alcohol or an alkylene oxide such as those disclosed above.

Other compounds which do not necessarily fit within any of the previously set forth classes of compounds which are quite suitable in the compositions of the present invention include the hydroxy-terminated polyurethane polymers, such as, a hydroxy-terminated polymer made by reacting an isocyanate with several moles of an alkylene glycol, such as propylene glycol modified crude methylene diphenyl diisocyanate.

A convention catalyst of the type normally used in the prior art for reacting isocyanates with active hydrogen-containing compounds to produce polyurethanes is preferably incorporated in the composition of this invention to increase the conversion rate of the system. The amount of the catalyst generally corresponds to about 0.01 to 5.0% of the combined weight of the polyisocyanate and the active hydrogen-containing compound. Suitable catalysts for this purpose include diethylene triamine ketimine, tetramethylethylene diamine, triethylene diamine, tetramethylbutane diamine, tetramethyl guanidine, trimethyl piperazine and metalloorganic salt catalysts which are polyvalent metal salts of an organic acid having up to about 18 carbon atoms. The organo portion of the salt may be either linear or cyclic and saturated or unsaturated. The polyvalent metal has a valence from about 2 to 4. Typical metalloorganic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis(phenyl mercury) dodecenyl succinate, phenyl mercuric benzoate, cadmium naphthenate, phenyl mercuric acetate, phenyl mercuric propionate, dibutyltin dilaurate, dibutyltin-di-2-ethylhexoate, phenyl mercury decanoate, di—(phenyl mercuric) dodecenyl succinate and the like.

In addition to the principal components other additives or ingredients which may be employed in the formulation in order to impart special properties to this composition include fillers and pigments. The amount of filler preferably ranges from about 20 to 120% of the total weight of the composition and the amount of pigment preferably ranges from about 3 to 100% of the total weight of the composition. Examples of suitable fillers are aluminum silicate, calcium silicate, magnesium silicate, calcium carbonate, barium sulfate, calcium sulfate, carbon blacks, silica and the like.

Examples of suitable pigments are titanium dioxide, zinc oxide, iron oxides, antimony oxide, chrome greens, chrome yellow, iron blue, siennas, molybdate oranges, organic pigments, such as, para reds, benzidine yellow, toluidine red, toners, phthalocyanines and the like.

The sodium alkyl sulfate, generally, contains from about six to twenty carbon atoms in the alkyl portion thereof. Preferably, the sodium alkyl sulfate contains from about ten to eighteen carbon atoms in the alkyl portion thereof. Representative sulfates include, for example, sodium decyl sulfate, sodium lauryl sulfate and the like. In the practice of the present invention the preferred sulfate is sodium lauryl sulfate.

The sulfate is employed by admixing it with the active hydrogen-containing compound prior to the introduction of the polyisocyanate thereinto.

Minor amounts of the sulfate are all that need be employed in the practice hereof. Generally, from about 0.01 to about 0.50 percent, by weight, of sulfate, based on the total weight of the system, is employed. Preferably, from about 0.025 to about 0.20 percent, by weight, of sulfate, based on the total weight, is employed.

As noted hereinabove, the elastomers hereof are prepared by mixing the active hydrogen-containing compound, to which has been added the pigment, catalyst and sulfate, with the polyisocyanate. Mixing is carried out on ambient temperatures or slightly elevated temperatures of about 100° F. to about 120° F.

The present invention provides urethane elastomers which produce athletic surfaces free of ripples at the knit line.

For a more complete understanding of the present invention reference is made to the following examples thereof. In the examples, which are to be construed as illustrative, rather than limitative, of the invention all parts are by weight absent indications to the contrary.

In each example a standard polyol formulation was employed. The formulation contained 504.4 parts of a 1000 equivalent weight polyoxypropylene glycol having an OH number of 56; 75.3 parts of a 1000 equivalent weight propylene oxide adduct of glycerol having an OH number of 56; 253 parts of calcined clay; 4.0 parts of iron oxide pigment and 1.28 parts of a phenyl mercuric carboxylate acid urethane catalyst.

The isocyanate used to prepare the elastomer was a blend of methylene diphenyl diisocyanate with an oligomer thereof blended therewith. Sufficient amounts of isocyanate were employed to maintain an NCO/OH ratio of about 1.05 to about 1.10.

EXAMPLE I

A series of pigmented polyol dispersions were prepared by admixing with the polyol formulation various surfactants. The series of dispersions were prepared to test the efficacy of the use of a sodium alkyl sulfate against similar surfactants. Each pigmented polyol dispersion was tested for Brookfield viscosity at varying rpm's. In Table I, below, there is set forth the surfactant additive, the amount thereof and the viscosity results thereof.

Each polyol formulation was prepared by blending together the polyols, the clay, the pigment and the catalyst and, thereafter, blending the surfactant thereinto.

TABLE I

| Surfactant Sample | Amt. of Surfactant, pbw | Brookfield Viscosity at 80° F., cps | | | |
|---|---|---|---|---|---|
| | | 20 rpm | 10 rpm | 4 rpm | 2 rpm |
| Control | — | 1640 | 1988 | 2900 | 4000 |
| A[1] | 0.34 | 1140 | 1220 | 1420 | 1700 |
| B[2] | 0.34 | 1534 | 1868 | 2700 | 3840 |
| C[3] | 0.34 | 1610 | 1972 | 2820 | 4000 |
| D[4] | 0.34 | 1540 | 1888 | 2750 | 3840 |
| E[5] | 0.34 | 1624 | 1988 | 2900 | 4040 |
| F[6] | 0.34 | 1420 | 1728 | 2420 | 3420 |
| G[7] | 0.34 | 1594 | 1968 | 2830 | 4020 |
| H[8] | 0.34 | 1530 | 1880 | 2700 | 3760 |
| I[9] | 0.34 | 1654 | 2088 | 3100 | 4440 |
| J[10] | 2.5 | 2400 | 3200 | 4570 | 7500 |
| K[11] | 1.02 | 1384 | 1640 | 2250 | 3100 |

[1] sodium lauryl sulfate (dry)
[2] sodium sulfonate of kraft lignin
[3] a long chain fatty acid ester containing multiple ether linkage and sold under the name SOTEX N
[4] a long chain fatty acid ester containing multiple ether linkages and sold under the name SOTEX 3CW
[5] a long chain fatty acid ester containing multiple ether linkages and sold under the name SOTEX CW
[6] a long chain fatty acid ester having alkyl amino linkages and sold under the name SOTEX CO No. 2
[7] polyvinyl pyrrolidone
[8] a long chain fatty acid ester and sold under the name SOTEX DO4
[9] a long chain fatty acid ester having multiple complex amino linkages and sold under the name SOTEX 10
[10] a sodium salt of polymerized carboxylic acid
[11] tetrapotassium salt of ethylene diamine tetraacetic acid It can be seen from the data that over the range of testing, the sodium lauryl sulfate containing dispersion evidenced the lowest viscosity.

EXAMPLE II

A series of pigmented polyurethane elastomers were prepared from the polyol formulation and the isocyanate by blending them together at about 100° F. Prior to adding the isocyanate to the polyol, a minor amount of a surfactant was added to the polyol formulation. The so-prepared elastomers were, then tested for Brookfield viscosity over varying speeds. The results of these tests are set forth in Table II, below.

TABLE II

| Surfactant Sample[1] | Surfactant amt. pbw | Brookfield Viscosity, 100° F., cps | | | | |
|---|---|---|---|---|---|---|
| | | 100 rpm | 50 rpm | 20 rpm | 10 rpm | 5 rpm |
| — | — | 850 | 916 | 1070 | 1240 | 1480 |
| A | 0.34 | 756 | 784 | 820 | 840 | 880 |
| B | 0.34 | 854 | 928 | 1080 | 1300 | 1600 |
| C | 0.34 | 838 | 904 | 1070 | 1260 | 1560 |
| D | 0.34 | 828 | 900 | 1060 | 1300 | 1480 |
| E | 0.34 | 836 | 904 | 1060 | 1260 | 1600 |
| F | 0.34 | 810 | 888 | 1110 | 1380 | 1760 |
| G | 0.34 | 820 | 888 | 990 | 1100 | 1280 |
| J | 2.50 | 1430 | 1560 | 1950 | 2400 | 3200 |
| K | 1.02 | 724 | 768 | 830 | 920 | 1080 |
| A | 0.08 | 696 | 736 | 800 | 860 | 1000 |

[1] Same connotations as in Example I

It is to be seen that the sodium lauryl sulfate surfactant imparts excellent reactions in the viscosity of polyurethane elastomer systems; as compared with other surfactants.

EXAMPLE III

This example illustrates the effects of the present invention on the thixotropy of polyurethane elastomers. A qualitative measure of thixotropy reduction can be obtained by comparing the viscosity of a system at differing shear rates. A plot of shear stress (Y coordinate) against the shear rate (X coordinate) will provide a linear plot which does not intercept the origin of the plot (i.e., Newtonian fluid), but, rather intercepts the Y coordinate. The distance of the intercept from the origin of the plot is directly related to the mixtures deviation from Newtonian. This measurement of thixotropy, i.e., Y intercept value, can, also, be achieved by computer analysis using a linear regression analysis. The following table, Table III, sets forth the Y intercept values for both polyol dispersions and urethane elastomers using various surfactants. The urethane elastomers were prepared by the same procedure outlined in Example II.

TABLE III

| Surfactant Sample[2] | Surfactant amount, wt.% | Y Intercept Value[1] | |
|---|---|---|---|
| | | Pigmented Polyol[3] | Urethane Elastomer[4] |
| — | — | 14.56 | 2.19 |
| A | 0.04 | 3.35 | 0.55 |
| A | 0.02 | 9.78 | 1.07 |
| A | 0.01 | 10.97 | 1.61 |
| B | 0.04 | 13.88 | 2.44 |
| C | 0.04 | 14.47 | 2.37 |
| D | 0.04 | 14.15 | 2.41 |
| E | 0.04 | 14.87 | 2.40 |
| F | 0.04 | 12.08 | 3.10 |
| G | 0.04 | 14.77 | not determined |
| I | 0.04 | 17.11 | not determined |
| J | 0.24 | 5.98 | 5.48 |
| K | 0.12 | 10.36 | 1.16 |

[1]linear regression analysis of shear stress using Brookfield viscometer versus shear rate, rpm's, extrapolated to zero shear rate, measured at 80° F.
[2]same connotations as in Example I
[3]determined using Brookfield viscometer spindle No. 2
[4]measured using Brookfield viscometer No. 4 spindle It is to be seen from the above that minor amounts of the sodium lauryl sulfate provide the greatest reduction in both viscosity and thixotropy.

Having, thus, described the invention what is claimed is:

1. In an essentially solvent-free pigmented polyurethane elastomer composition of the type comprising on organic polyisocyanate, an active hydrogen-containing compound, a pigment and a catalyst, the improvement which comprises:
   a minor amount of a sodium alkyl sulfate, the sulfate reducing the thixotropy and viscosity of the elastomer composition.
2. The improvement of claim 1 wherein: the sulfate contains from about six to twenty carbon atoms in the alkyl portion.
3. The improvement of claim 1 wherein: the sulfate is sodium lauryl sulfate.
4. The improvement of claim 1 wherein: the sulfate is present in an amount ranging from about 0.01 to about 0.50 percent, by weight, based on the total weight of the dispersion.
5. The improvement of claim 4 wherein: the sulfate is present in an amount ranging from about 0.025 to about 0.20 percent, by weight, based on the total weight of the dispersion.
6. A method for reducing the viscosity and thixotropy of an essentially solvent-free pigmented polyurethane elastomer, comprising:
   adding to the elastomer a minor amount of a sodium alkyl sulfate.
7. The method of claim 6 wherein: the elastomer is prepared by reacting an active hydrogen-containing compound with an organic polyisocyanate, the sulfate and the pigment being blended with the active hydrogen-containing compound prior to the reaction thereof with the polyisocyanate.
8. The method of claim 7 wherein: the active hydrogen containing compound is a polyether polyol.
9. The method of claim 7 wherein: the sulfate contains from about six to twenty carbon atoms in the alkyl portion thereof.
10. The method of claim 7 wherein: the sulfate is present in an amount ranging from about 0.01 to about 0.50 percent, by weight, based on the total weight of the dispersion.
11. The method of claim 7 wherein: the sulfate is sodium lauryl sulfate.
12. A coating for athletic surfaces comprising: the improvement of claim 1.
13. The coating of claim 12 wherein: the sulfate is sodium lauryl sulfate.
14. The coating of claim 12 wherein: the sulfate is present in an amount ranging from about 0.01 to about 0.50 percent, by weight, based on the total weight of the dispersion.

* * * * *